United States Patent
Gainey et al.

(10) Patent No.: US 8,937,874 B2
(45) Date of Patent: Jan. 20, 2015

(54) ADJUSTING REPEATER GAINS BASED UPON RECEIVED DOWNLINK POWER LEVEL

(75) Inventors: Kenneth M. Gainey, San Diego, CA (US); Dhananjay Ashok Gore, Bangalore (IN); James Arthur Proctor, Jr., Melbourne Beach, FL (US)

(73) Assignee: Qualcomm Incorporated, San Diego, CA (US)

( * ) Notice: Subject to any disclaimer, the term of this patent is extended or adjusted under 35 U.S.C. 154(b) by 569 days.

(21) Appl. No.: 13/243,899

(22) Filed: Sep. 23, 2011

(65) Prior Publication Data

US 2013/0077502 A1 Mar. 28, 2013

(51) Int. Cl.
*H04L 12/26* (2006.01)
*H04B 7/155* (2006.01)

(52) U.S. Cl.
CPC ................................. *H04B 7/15578* (2013.01)
USPC ............. 370/252; 370/315; 455/10; 455/13.4

(58) Field of Classification Search
CPC .... H04B 17/02; H04B 17/003; H04B 7/2606; H04B 7/155; H04B 7/18543; H04W 88/04; H04W 16/26; H04W 84/047; H04W 52/46
USPC ................. 370/241, 246, 252, 310, 315, 318; 455/7, 9, 10, 11.1, 13.4
See application file for complete search history.

(56) References Cited

U.S. PATENT DOCUMENTS

| | | | |
|---|---|---|---|
| 5,835,848 A | 11/1998 | Bi et al. | |
| 7,020,436 B2 | 3/2006 | Schmutz | |
| 7,050,758 B2 * | 5/2006 | Dalgleish et al. | ............ 455/11.1 |
| 7,355,993 B2 | 4/2008 | Adkins et al. | |

(Continued)

FOREIGN PATENT DOCUMENTS

| | | |
|---|---|---|
| CN | 201332396 Y | 10/2009 |
| EP | 2053812 A2 | 4/2009 |

(Continued)

OTHER PUBLICATIONS

Ghosh D. et al., "Uplink-Downlink Imbalance in Wireless Cellular Networks", Proceedings of the 2007 IEEE International Conference on Communications (ICC 2007), Jun. 24-28, 2007, Glasgow, UK, IEEE, Piscataway, NJ, USA, Jun. 1, 2007, pp. 4275-4280, XP031126338, ISBN: 978-1-4244-0353-0.

(Continued)

*Primary Examiner* — Chi H Pham
*Assistant Examiner* — Weibin Huang
(74) *Attorney, Agent, or Firm* — Muncy, Geissler, Olds & Lowe, P.C.

(57) ABSTRACT

A method of controlling gains within a repeater may include determining a power control set point value which controls a transmit power of a mobile station (MS), and receiving a downlink signal from a base station transceiver system (BTS). The method may further include measuring a power of the received downlink signal, and computing a power level of a signal expected at the uplink of the repeater, wherein the computing is based on the measured downlink power and the power control set point value. Finally, the method may further include adjusting a gain of at least one amplifier based on the computed power level. An apparatus for controlling gains in a repeater may include a baseband processor for performing the above method.

39 Claims, 6 Drawing Sheets

(56) References Cited

U.S. PATENT DOCUMENTS

| | | |
|---|---|---|
| 7,406,300 B2 | 7/2008 | Pan |
| 7,627,287 B2 | 12/2009 | Moss |
| 8,619,837 B2 * | 12/2013 | Proctor et al. ............... 375/211 |
| 2002/0045461 A1 | 4/2002 | Bongfeldt |
| 2003/0123401 A1 | 7/2003 | Dean |
| 2004/0095907 A1 | 5/2004 | Agee et al. |
| 2005/0079849 A1 | 4/2005 | Na et al. |
| 2006/0039550 A1 | 2/2006 | Chadha et al. |
| 2006/0084379 A1 | 4/2006 | O'neill |
| 2008/0064354 A1 | 3/2008 | Lee et al. |
| 2008/0125033 A1 | 5/2008 | Lee et al. |
| 2008/0225929 A1 | 9/2008 | Proctor et al. |
| 2009/0061766 A1 | 3/2009 | Ding et al. |
| 2009/0093212 A1 | 4/2009 | Shimizu et al. |
| 2010/0009625 A1 | 1/2010 | Chami et al. |
| 2010/0284280 A1 | 11/2010 | Gore et al. |
| 2010/0285737 A1 | 11/2010 | Gore et al. |
| 2011/0170473 A1 | 7/2011 | Proctor, Jr. et al. |
| 2012/0002586 A1 | 1/2012 | Gainey et al. |
| 2013/0072111 A1 * | 3/2013 | Gunnarsson ............... 455/9 |
| 2013/0077556 A1 | 3/2013 | Gore et al. |
| 2014/0011442 A1 * | 1/2014 | Dussmann ............... 455/10 |

FOREIGN PATENT DOCUMENTS

| | | |
|---|---|---|
| KR | 20080102066 A | 11/2008 |
| WO | 2004077688 A2 | 9/2004 |
| WO | WO2009014281 A1 | 1/2009 |
| WO | 2011087040 A1 | 7/2011 |

OTHER PUBLICATIONS

International Search Report and Written Opinion—PCT/US2012/056637—ISA/EPO—Dec. 11, 2012.

Ito, Y. et al., "Novel repeater with automatic gain-control for indoor area". 2005 Asia-Pacific Microwave Conference, Dec. 4-7, 2005, Suzhou, China. 3 pp., 2006. ISBN-10: 0 7803 9433 X.

* cited by examiner

ADJUSTING REPEATER GAINS BASED UPON RECEIVED DOWNLINK POWER LEVEL

REFERENCE TO CO-PENDING APPLICATIONS FOR PATENT

The present Application for Patent is related to the following co-pending U.S. patent applications: "SETTING GAINS IN AN INTERFERENCE CANCELLATION REPEATER BASED ON PATH LOSS" having U.S. application Ser. No. 13/243,822, filed Jan. 23, 2011, assigned to the assignee hereof, and expressly incorporated by reference; and "USE OF RF REFERENCE IN A DIGITAL BASEBAND INTERFERENCE CANCELLATION REPEATER" having U.S. application Ser. No. 12/686,608, filed on Jan. 13, 2010, assigned to the assignee hereof, and expressly incorporated by reference herein.

FIELD

Aspects of this disclosure generally relate to wireless communication systems, and more specifically, to uplink and/or downlink gain adjustment methods and apparatuses for use in wireless repeaters.

BACKGROUND

In wireless communication systems, mobile stations (MSs) may exchange signals with one or more base station terminal systems (BTSs) which can provide service within a surrounding geographic region. A coordinated network of BTSs may provide wireless communication service to an expansive coverage area. However, due to various geographic, electromagnetic and/or economic constraints, the network of BTSs may lack adequate communication services in some areas within a desired coverage area. These "gaps" or "holes" in the coverage area may be filled with the use of repeaters.

Generally, a repeater is a high gain bi-directional amplifier. Repeaters can receive, amplify and re-transmit signals in both the uplink direction (from the MS to the BTS) and the downlink direction (from the BTS to the MS). The repeater may provide communication service to the coverage hole, which was previously not serviced by the BTS. Repeaters may also augment the coverage area of a sector by shifting the location of the coverage area or altering the shape of the coverage area. Conventional repeaters may utilize fixed gains which may not be optimal as the MS changes location and/or as the channel conditions vary. Moreover, in communications systems where controlling power is important to good system performance (e.g., CDMA systems), each MS within a cell may have its power settings under direct control of the serving BTS. Conventional repeaters having a fixed repeater gain may not be amenable to these standard types of BTS power control.

In addition, a repeater is not a noiseless device and may contribute additional noise into the receiver at the BTS. While one repeater may not appreciably increase the noise floor at the BTS, the cumulative effect of many repeaters may noticeably raise the noise floor of the BTS, thereby reducing the effectiveness of the communication links in the coverage area. While the amount of signal and noise broadcast back to the BTS can be manipulated by adjusting the repeater gain and the repeater to donor antenna gains, it may be challenging to simply set the total link gain to a desired value in conventional repeaters.

Moreover, some repeaters may perform various signal processing operations in the digital domain (e.g., interference cancellation repeaters designed to reduce feedback between uplink and downlink channels). Accordingly, these repeaters will use analog-to-digital converters (ADCs) which typically require the dynamic range of the analog signal input to be within a designated range, depending upon the number of bits output by the ADC. If the input analog signal exceeds the dynamic range of the ADC, non-linear forms of noise may result. For example, if the input analog signal is too low, quantization noise may become dominant and significantly degrade the digital conversion process. At the other extreme, if the input analog signal level is too high, the ADC will become saturated, and the full scale value of the ADC's output will be exceeded.

Conventional approaches to avoid these types of non-linear distortion typically involve automatic gain controllers (AGCs) to limit the dynamic range of the analog signal so that it "fits" into the ADC. However, for interference cancellation repeaters, the AGC prevents accurately estimating the feedback channel because step changes in signal amplitudes can cause oscillations. Accordingly, for interference cancellation repeaters, the ADCs conventionally utilize a wider dynamic range (i.e., a large number of bits) in order to properly accommodate the wide range in levels of the input signals, which include both the communication signals and the feedback signals appearing at the front end of the repeater. Utilizing ADCs capable of accepting such wide dynamic ranges increases costs, both for the ADC components themselves, and for subsequent digital components having to accommodate more bits being provided by the ADCs.

Accordingly, it may be desirable to adjust the gain within the repeaters using simple and cost effective techniques in order to reduce the noise floor seen at the receiver of the BTS, and to reduce costs of the ADCs and associated digital components in digital signal processing repeaters.

SUMMARY

Exemplary embodiments of the invention are directed to systems and methods for adjusting repeater gains based upon received downlink power level.

In one embodiment, a method of controlling gains within a repeater is provided. The method may include determining a power control set point value which controls a transmit power of a mobile station (MS), and receiving a downlink signal from a base station transceiver system (BTS). The method may further include measuring a power of the received downlink signal, and computing a power level of a signal expected at the uplink of the repeater, where the computing is based on the measured downlink power and the power control set point value. Finally, the method may further include adjusting a gain of at least one amplifier based on the computed power level.

In another embodiment of the method, determining the power control set point value may further include reading a value provided in a control channel, retrieving a value stored in memory, reading a message provided in a data channel, and/or receiving the value from a simple message service (SMS) message.

In another embodiment of the method, measuring the power of the received downlink signal may further include performing interference cancellation on a combined signal to remove a leakage signal, and computing the power level of the received downlink signal after interference cancellation.

In another embodiment, an interference cancellation repeater which controls gains based on measuring the downlink power received from a base station is provided. The interference cancellation repeater may include first transceiver coupled to a donor antenna, a second transceiver coupled to a serving antenna, and a baseband processor coupled to the first transceiver and the second transceiver. The baseband processor may be configured to determine a power control set point value which controls a transmit power of a mobile station (MS), receive a downlink signal from a base station transceiver system (BTS), measure a power of the received downlink signal, compute a power level of a signal expected at the uplink of the repeater. The computing may be based on the measured downlink power and the power control set point value. The baseband processor may be further configured to adjust a gain of at least one amplifier based on the computed power level.

In yet another embodiment, the interference cancellation repeater may include a baseband processor that may be further configured to read a value provided in a control channel, retrieve a value stored in memory, read a message provided in a data channel, and/or receive the value from a simple message service (SMS) message.

In yet another embodiment, the interference cancellation repeater may include a baseband processor that may be further configured to perform interference cancellation on a combined signal to remove a leakage signal; and compute the power level of the received downlink signal after interference cancellation.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
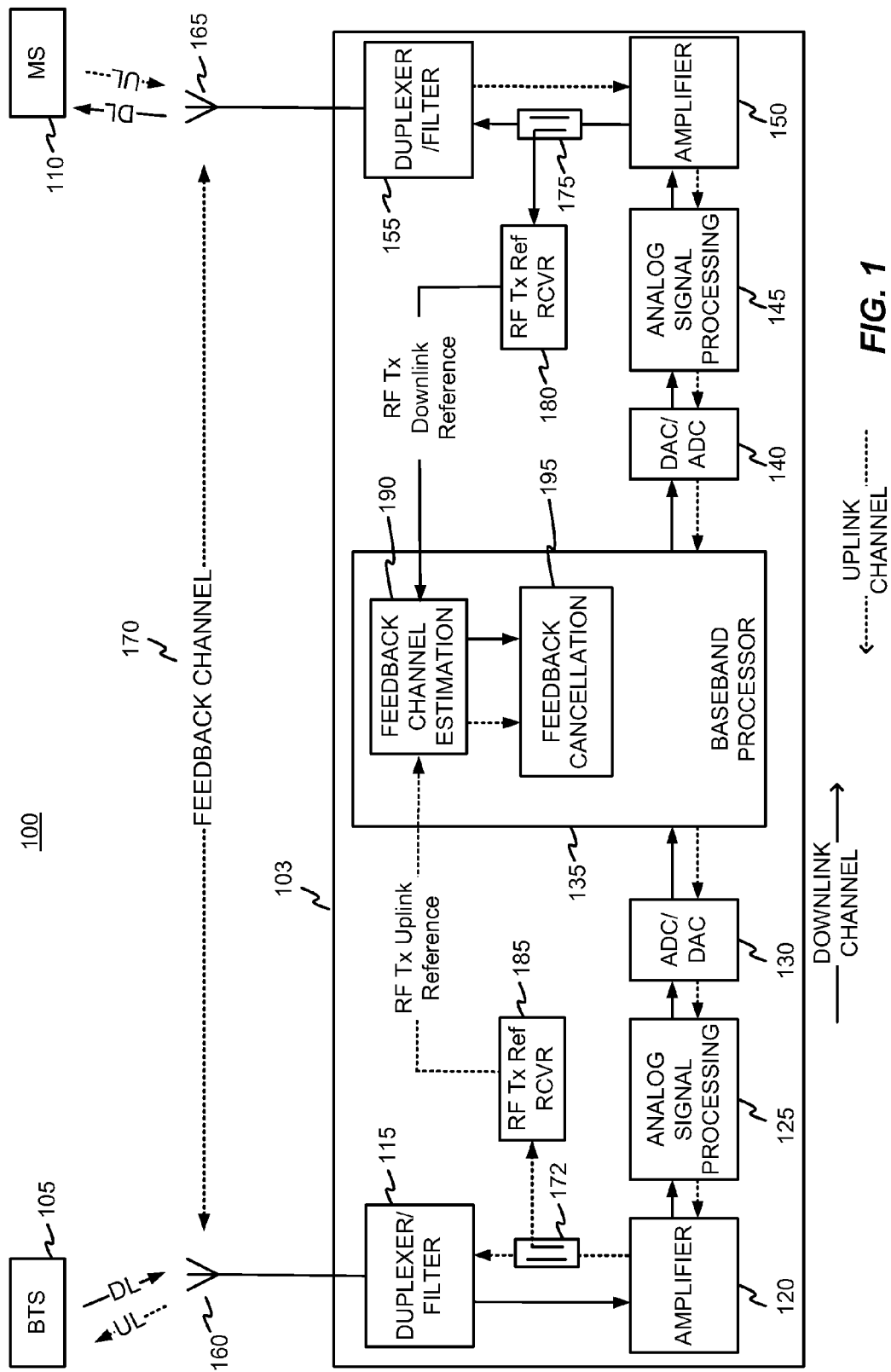
FIG. 1 is a block diagram of a system using a frequency division duplex (FDD) digital baseband interference cancellation repeater.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Overview

Embodiments presented herein may be directed to repeaters which can leverage measurements of the signal level received from the base station (downlink signal), and information conventionally used for standard power control of the mobile station, to control various gains within the repeater for improving performance and managing the repeater's noise contribution at the base station (i.e., uplink noise).

For example, in one embodiment, the gain of the repeater in the uplink channel (i.e., "uplink gain") may be adjusted to control the noise at the receiver of the base station. The uplink gain may be adjusted based upon the power control set point parameter (PC_SP) and an RSSI measurement of the downlink signal received at the repeater which was transmitted from the base station.

In another embodiment, the gain of the repeater on the downlink channel (i.e., "downlink gain") may be adjusted to control the level of the signal received back at the repeater on the uplink channel. This technique takes advantage of the power control system operating in the mobile station, thus "remotely" controlling (at the repeater) the output of the mobile station's transmit signal level by adjusting the gain of the signal the mobile station receives on the downlink channel. This type of adjustment can improve the signal level for quantization by the ADC in the uplink channel, which can improve performance and/or relax the dynamic range requirements of the ADC, thus allowing for a less expensive ADC to be used. The downlink gain may be adjusted based upon the power control set point parameter (PC_SP) and an RSSI measurement of the signal received at the repeater which was transmitted from the base station (i.e., the downlink signal from the base station).

In other embodiments, these aforementioned techniques may be combined to mitigate uplink noise at the base station and also improve ADC performance. In yet other embodiments, such techniques could be combined with information used by interference cancellation algorithms (e.g., RF uplink/downlink reference signals) to improve uplink transmit power while mitigating uplink noise levels at the base station. Various embodiments are presented in more detail below.

Interference Cancellation Repeaters

FIG. 1 is a block diagram of a wireless communications system 100 which includes a frequency division duplex (FDD) digital baseband interference cancellation repeater 103. The repeater 103 may simultaneously exchange signals with a Base station Transceiver System (BTS) 105 and at least one Mobile Station (MS) 110 (only one MS is shown in FIG. 1). Signals traveling from the BTS 105, through the repeater 103, towards the MS 110 are said to be on the "downlink." Signals travelling from the MS 110, through the repeater 103, towards the BTS 105 are said to be on the "uplink." The repeater 103 may amplify signals going in both directions without concern of the gain relative to each device or the power received. The repeater 103 may use a conventional gain setting arrangement where a fixed offset between the downlink and uplink may be used to set the overall gain of the repeater 103.

The repeater 103 may retransmit a signal on the same frequency as which it was received. In a frequency division duplex repeater, the uplink and downlink signals are separated by two channels centered at different frequencies. Accordingly, the repeater 103 may transmit and receive simultaneously using separate uplink and downlink channels. In FIG. 1, for ease of explanation, blocks 120-150 comprising the uplink and downlink channels are shown in a combined bi-directional path, where the path going from left to right designated by solid arrows represents the downlink channel, and the path going from right to left designated by dashed arrows represents the uplink channel.

In certain realizations, where the entire repeater 103 is contained in an enclosure and antennas 160 and 165 are integral therein, the antennas 160, 165 may not provide sufficient isolation between the uplink and downlink channels within the repeater 103. When more gain is desired than isolation that exists between antennas 160 and 165, baseband interference cancellation may be used to increase the stability of the repeater and increase the overall gain. This may be accomplished by actively cancelling out the transmitted signal provided over the feedback channel 170 using digital processing, as will be described in more detail below.

During operation, the downlink signal may be transmitted by BTS 105 and subsequently received by antenna 160. Also received by antenna 160 is a leakage signal, which is provided over a feedback channel 170, and superimposed on the downlink signal to produce a combined signal. The combined signal may be filtered into separate uplink and downlink frequency bands and routed along the appropriate downlink channel by duplexer 115. The combined signal may be further processed in the analog domain by the amplifier 120 and the analog signal processing block 125. The amplifier 120 may provide amplification using a low noise RF amplifier. The analog processing in analog signal processing block 125 may include, for example, filtering using a RF Surface Acoustic Wave (SAW) filters. The analog signal processing block 125 may further down convert the combined signal to baseband, perform IQ conversion and additional filtering for alias rejection. The signal may then be digitized by an analog-to-digital converter (ADC) 130.

The digitized combined signal may be processed by a baseband processor 135 to remove the leakage signal received over the feedback channel 170. The baseband processor 135 may actively cancel out the leakage signal by applying an appropriate channel filter to a transmit (Tx) reference signal to create a predicted feedback signal. Once the predicted feedback signal is determined, it can be subtracted from the combined signal by the baseband processor 135 in feedback cancellation block 165. The channel filter may be generated in a feedback channel estimation block 190.

Further referring to the downlink channel path, the channel estimate may be determined utilizing the appropriate Tx downlink reference signal, which in the embodiment shown in FIG. 1, may be obtained by tapping the transmit signal after amplification by amplifier 150 using RF coupler 175. An RF Tx reference receiver 180 may take the RF Tx downlink reference signal from the RF coupler 175 to process (e.g., down convert, filter, etc.) and digitize the signal so it may be feed back into the baseband processor 135 for use by the feedback channel estimation block 190. Feedback channel estimation block 190 can perform channel estimation of the feedback channel 170 using, for example, frequency domain minimum means square error (MMSE) techniques. The leakage signal superimposed on the downlink signal may be cancelled out and removed by the baseband processor 135 by convolving the channel estimate with the digitized RF Tx downlink reference signal to obtain the estimated leakage signal. Once the estimated leakage signal is determined, it may be cancelled from the combined signal in feedback cancellation block 195 by inverting it (shifting it 180 degrees out of phase) and adding it to the combined signal.

In other embodiments (not shown), a digitized Tx downlink reference signal may be obtained directly from the ADC/DAC 140. However, using an RF Tx downlink reference signal as shown can have the advantage of allowing the channel estimation algorithms include and account for the distortions associated with the components of the transmitter chain (e.g., ADC/DAC 140, analog signal processor block 145, amplifier 150, etc.). This can improve the accuracy of the channel estimation and thus the interference cancellation, which in turn can improve the power transmitted from the amplifier 150 due to the increase isolation.

Further referring to the downlink channel in FIG. 1, once the leakage signal is removed, the downlink signal may be converted to an analog signal by DAC/ADC 140. The analog signal may be further processed in the analog domain by analog signal processing block 145. Analog signal processing block 145 may include image rejection filtering, IQ up-conversion, and further RF filtering using, for example, using SAW filters for mitigating inter-channel interference. Finally, power amplification may be provided by RF power amplifier 150 The amplified signal may subsequently be passed on to duplexer/filter 155 for additional filtering to separate the downlink and uplink channels, and routed to antenna 165 for downlink transmission to the MS 110.

Uplink signals provided by the MS 110 may be simultaneously received by antenna 165. Similar to the downlink channel described above, a leakage signal, provided over feedback channel 170 transmitted by antenna 160, is superimposed on the uplink channel at antenna 165. The combined signal is provided to duplexer/filter 155 which filters the combined signal, and routes the signal over the appropriate uplink channel in the repeater. In FIG. 1, the uplink channel is shown in dashed lines and shares the same processing blocks with the downlink channel to simplify the diagram. The processing occurring in the uplink channel proceeds in the opposite direction from right to left in FIG. 1, but may be basically the same as described above in the downlink channel. It should be noted that the uplink channel may perform a separate feedback channel estimation which may use a separate RF Tx uplink reference signal to facilitate the channel estimation. The RF Tx uplink reference may tap off of the amplifier 120 output using RF coupler 172. The analog RF signal may be provided to RF Tx Ref receiver 185 for processing and digitization. The digitized RF Tx uplink reference signal may then be provided to baseband processor 135 so that the feedback channel for the uplink channel may be estimated by the feedback channel estimation block 190. Similar in the manner described above for the downlink channel, the feedback channel estimate for the uplink channel may be used in conjunction with the channel estimate to remove the leakage signal from the combined uplink signal received over antenna 165.

In the repeater 103, as the overall gain of the repeater is increased, the leakage signal becomes proportionally larger. This increases the dynamic range of the combined signal in the uplink and downlink channels. This results in utilizing analog-to-digital converters having a higher dynamic range to avoid non-linear quantization errors/saturation, which increases the component costs of the repeater. The increased dynamic range may further result in received signal de-sensitization, can limit the transmitter output levels, and increase the noise contribution at the base station receiver.

Power Interaction Between Repeater, BTS, and MS

Embodiments described herein may reduce the aforementioned effects of increased dynamic range by adjusting various gains within the repeater based upon the measured power of the received downlink signal and parameters associated with conventional power control techniques for mobile stations. By utilizing, for example, the power control set point parameters associated with power control techniques used in wireless standards (e.g., CDMA, IS-2000, UMTS, etc.), a computation of the uplink signal power may be determined prior to receiving the uplink signal from the mobile station. As used herein, a power control set point parameter may be any parameter provided to the MS 110 that can be used to set the signal level (e.g., voltage, power, amplitude, intensity, etc.) of a transmission sent by the MS 110 over the uplink channel. The power control set point value may be an open loop set point value, a closed loop set point value, or any other value which may be directly provided or derived from at least one other value provided by one or more sources (e.g., messages or values provided by data channels, control channels, external devices, etc.), or any combination thereof. This information may permit the repeater to set appropriate gains in one or more amplifiers in the downlink channel, and thus reduce the dynamic range of the combined signal in the uplink channel prior to digitization. This approach may greatly mitigate the limitations of the repeater 103 having a single fixed dynamic range configuration. Additionally, information derived from the measured downlink signal level may be used to manage the uplink noise contribution by controlling the gain of the appropriate amplifier(s) after digital-to-analog conversion.

Figure 2:
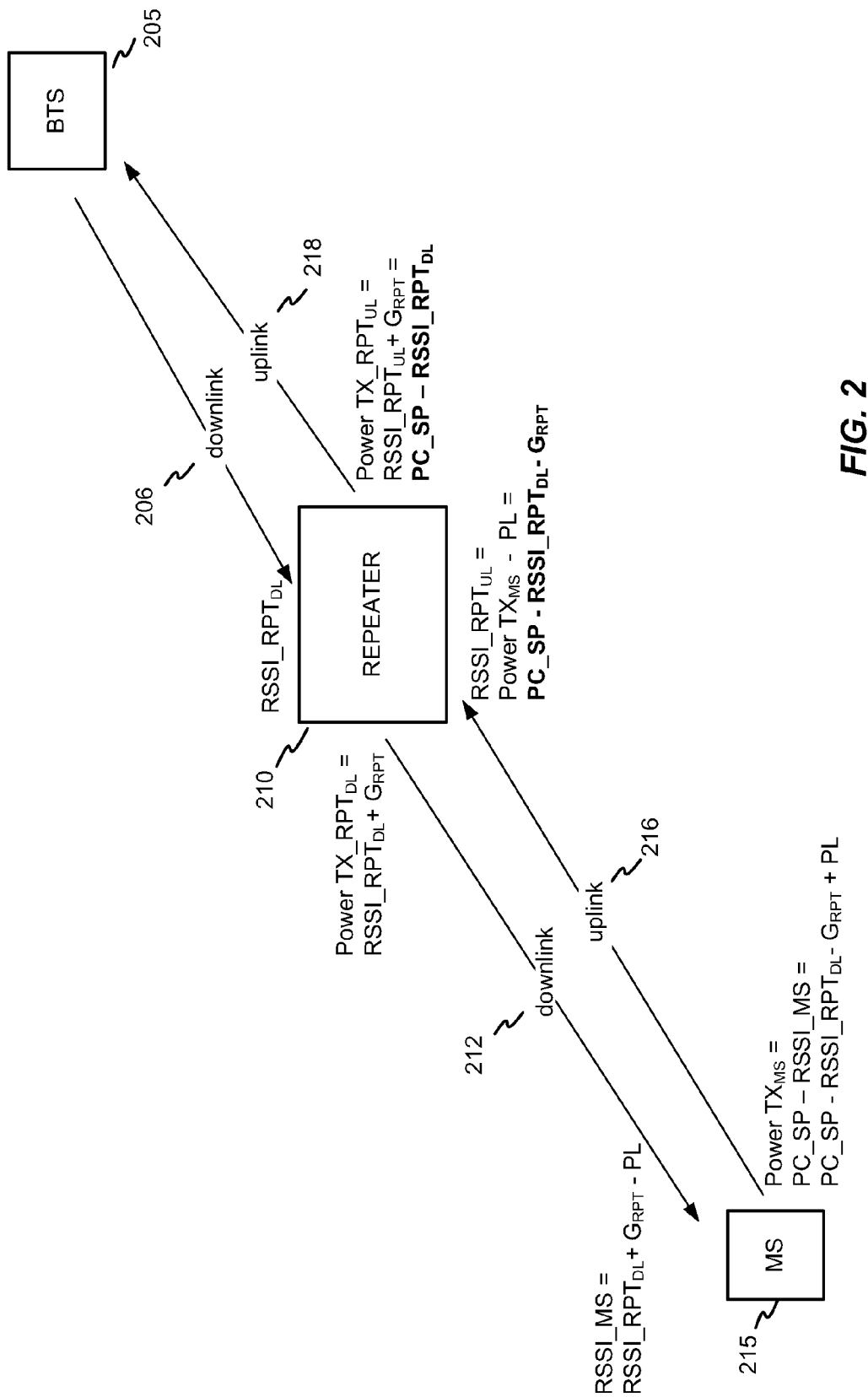
FIG. 2 is a diagram illustrating an example of the power interaction between a base station transceiver system (BTS), a mobile station (MS) and a repeater consistent with an embodiment of the disclosure.

FIG. 2 is a diagram illustrating an example of the power interaction between a base station transceiver system (BTS) 205, a mobile station (MS) 215, and a repeater 210 consistent with an embodiment of the disclosure. The power interaction between the BTS 205 and the MS 215 may be "predictable" (i.e., determined analytically prior to actual transmission/reception) due to the power control algorithms used in wireless communication systems, and as will be shown below, this predictability can be leveraged to control various gains within the repeater 210.

Power control is highly desirable in CDMA-based communication systems because all of the mobile stations communicating with a base station transceiver share the same RF band through the use of PN codes. Because the PN codes spread each mobile station's signal across the RF band, the signal of each mobile station appears as noise to the other mobile stations in the cell. The power transmitted by each mobile station should therefore be carefully controlled in order to avoid interference. This control attempts to equalize the power received at the base station by having it instruct each mobile station to adjust its transmitted power to compensate for variations in conditions affecting signal levels between each mobile and the base station (such as, for example changing distance due to movement of the mobile station 215). For example, a mobile station at a greater distance from base station will be instructed to transmit at a higher power than another mobile station in close proximity to the base station.

To illustrate how parameters associated with power control, and the measured downlink signal level (e.g., RSSI) at the repeater, can be used to compute both the uplink transmit power received at the repeater from the mobile, and the uplink power transmitted from the repeater 210 to the base station terminal system (BTS) 205, a model illustrating the power interaction between one mobile station (MS) 215, a repeater 210, and a base station system (BTS) is provided in FIG. 2. As shown in FIG. 2, a downlink signal 206 transmitted by the BTS 205 may result in a Received Signal Strength Indicator (RSSI) value at the repeater 210 of $RSSI\_RPT_{DL}$. The repeater 210 will amplify this received signal and re-transmit a downlink signal 212 to the MS 215. The power of the signal re-transmitted by the repeater, Power $TX\_RPT_{DL}$, may be quantified as:

Power $TX\_RPT_{DL} = RSSI\_RPT_{DL} + G_{RPT}$, where $G_{RPT}$ is the gain of the repeater.

At the MS 215, the RSSI of the received signal, RSSI_MS, may be described as:

$RSSI\_MS = RSSI\_RPT_{DL} + G_{RPT} - PL$, where PL is the signal path loss between the repeater 210 and the MS 215.

Because of the power control rules used by the mobile station, the mobile station will transmit its uplink signal 216 having power based on the following equation:

Power $TX_{MS} = PC\_SP - RSSI\_MS = PC\_SP - RSSI\_RPT_{DL} - G_{RPT} + PL$, where the PC_SP value is the Power Control Set Point, and may be based upon the power control algorithm being used.

Note that the PC_SP value may depend on a variety of different conditions, such as the type of network standard being used (e.g., IS-2000, WCDMA, LTE, UMTS, etc.). Additionally, the PC_SP may also vary depending upon the transmission parameters the MS 215 is using based upon its operational mode. For example, in an IS-2000 system, the PC_SP may vary based on the band class, the spreading rate, the state of the reverse channels, etc. In one embodiment, the repeater may extract this value by decoding the control channels transmitted by the BTS 205.

Further referring to FIG. 2, on the other side of uplink 216, the repeater will received the signal transmitted by the mobile station 215 with the following RSSI value, $RSSI\_RPT_{DL}$:

$RSSI\_RPT_{DL} = $ Power $TX_{MS} - PL = PC\_SP - RSSI\_RPT_{DL} - G_{RPT}$.

(Note the path loss between the repeater 210 and the mobile station 215 cancels out.)

After the uplink signal 216 is received by the repeater 210, the repeater 210 may transmit the uplink signal 218 having the following power, Power TX_RPT$_{UL}$:

Power TX_RPT$_{DL}$=RSSI_RPT$_{DL}$+G$_{RPT}$=PC_SP−RSSI_RPT$_{DL}$.

From the above equations, it can be seen that uplink RSSI (RSSI_RPT$_{DL}$) received at the repeater may be predicted from the downlink RSSI seen at the repeater (RSSI_RPT$_{DL}$), the PC_SP value being used by the MS 215, and the repeater 210 gain G$_{RPT}$. Moreover, the uplink power transmitted by the repeater 210 (Power TX_RPT$_{UL}$) to the BTS 205 may be predicted in the same manner.

This can be intuitively seen from the purpose of the power control rules, which is to equalize the power at the base station and compensate for varying distances between the base station and the mobile terminals. Based on the power control rules, one can generally infer that if the RSSI of the downlink signal transmitted by the base station is high, then distance between the mobile station and the base station can be presumed to be small, thus the mobile station can be expected to transmit a lower power back to the base station on the uplink to compensate for their close relative proximity. Conversely, one can infer that if the RSSI of the downlink signal is low, then it can be presumed that the mobile station and the base station are far apart, and thus the mobile station can be expected to transmit a higher power back to the base station the uplink to compensate for the greater distance.

It can also be seen that the uplink RSSI is independent of the repeater to mobile station path loss (ignoring fading, which may be controlled by fast closed loop power control).

As used herein, MS 215 may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

BTS 205 may be part of terrestrial based communication systems and networks that include a plurality of PCS/cellular communication cell-sites. They can be associated with CDMA or TDMA (or hybrid CDMA/TDMA) digital communication systems, transferring CDMA or TDMA type signals to or from remote stations. Signals can be formatted in accordance with IMT-2000/UMTS standards, using WCDMA, CDMA2000 or TD-SCDMA type signals. On the other hand, the BTS 205 can be associated with an analog based communication system (such as AMPS), and transfer analog based communication signals.

The embodiments described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Repeater Gain Control: Mitigating Noise Contribution at BTS

Figure 3:
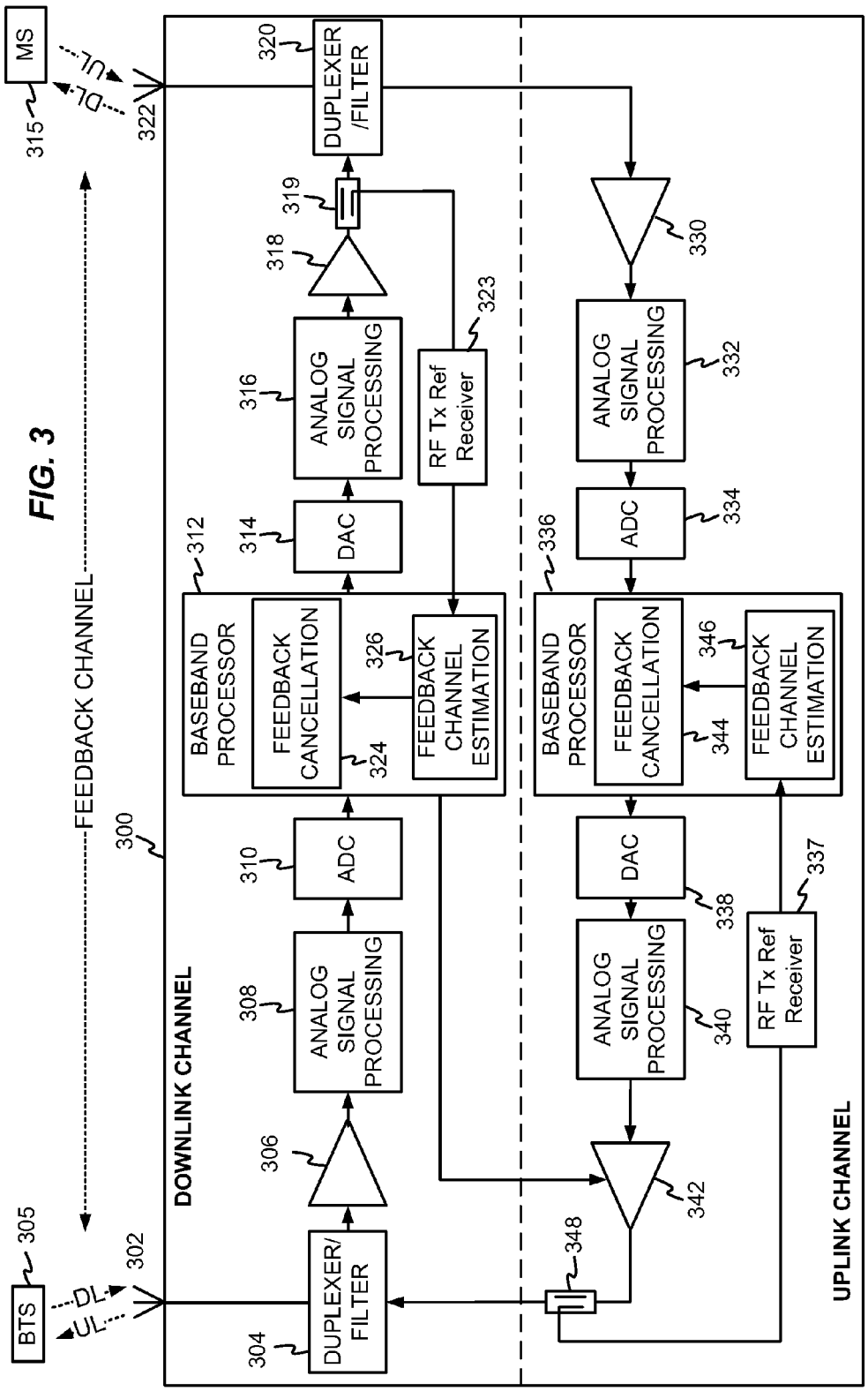
FIG. 3 shows a block diagram of an exemplary FDD digital baseband interference cancellation repeater which may control uplink gain based upon the measured downlink RSSI and the power control set point value.

By leveraging the information which can be determined from the measured downlink RSSI and the power control set point of the MS, one can appropriately set the gain on the uplink of the repeater to reduce the noise contribution of the repeater at the BTS. FIG. 3 shows a block diagram of an exemplary FDD digital baseband interference cancellation repeater 300 which may control uplink gain based upon measured downlink RSSI and power control set point value.

The repeater 300 may receive at antenna 302 a downlink signal from a BTS 305 and a leakage signal from antenna 322. The combined downlink signal may be provided to duplexer/filter 304 which may perform filtering and appropriate switching of signals to separate the downlink and the uplink signals. In the case of a received downlink signal, the duplexer/filter 304 will route the combined signal to the downlink channel. The combined downlink signal may be amplified by low noise amplifier 306 to increase its gain. The combined downlink signal may be further processed in the analog domain by the analog signal processing block 308. The analog processing may include, for example, filtering using an RF Surface Acoustic Wave (SAW) filters, down conversion to baseband, performing IQ conversion, and additional filtering for alias rejection. The combined downlink signal may then be digitized by an analog-to-digital converter (ADC) 310.

The digitized combined downlink signal may be processed by a baseband processor 312 to remove the leakage signal received over the feedback channel. The baseband processor 312 may actively cancel out the leakage signal by applying an appropriate channel filter to a transmit (Tx) reference signal to create the predicted feedback signal. Once the predicted feedback signal is determined, it can be subtracted from the combined downlink signal by the baseband processor 312. The channel filter may be generated in a feedback channel estimation block 326.

Further referring to the downlink channel, the feedback channel estimate may be determined utilizing the appropriate Tx downlink reference signal which may be obtained by tapping the transmit signal after amplification by RF amplifier 318 using RF coupler 319. An RF Tx reference receiver 323 may take the RF Tx downlink reference signal from the coupler 319 to process (e.g., down convert, filter, etc.) and digitize the signal so it may be feed back into the baseband processor 312 for use by the feedback channel estimation block 326. Feedback channel estimation block 326 can perform channel estimation of the feedback channel using for example, frequency domain minimum means square error (MMSE) techniques. The leakage signal superimposed on the downlink signal may be cancelled out and removed by the baseband processor 312 by convolving the channel estimate with the digitized RF Tx downlink reference signal to obtain the estimated leakage signal. Once the estimated leakage signal is determined, it may be cancelled from the combined downlink signal in feedback cancellation block 324 by shifting it 180 degrees out of phase and adding it to the combined signal.

In other embodiments (not shown), a digitized Tx downlink reference signal may be obtained directly from the ADC 310. However, using an RF Tx downlink reference signal as shown can have the advantage of allowing the channel estimation algorithms include and account for the distortions associated with the components of the transmitter chain (e.g., DAC 314, analog signal processing block 316, RF amplifier 318, RF coupler 319 etc.). This can improve the accuracy of the channel estimation and thus the interference cancellation, which in turn can improve the power transmitted from the RF amplifier 318 due to the increase isolation.

Further referring to the downlink channel in FIG. 3, once the leakage signal is removed, the downlink signal may be converted to an analog signal by DAC 314. The analog signal may be further processed in the analog domain by analog signal processing block 316. Analog signal processing block 316 may include image rejection filtering, IQ up-conversion, and further RF filtering using, for example, SAW filters for inter-channel interference. Finally, power amplification may be provided by RF amplifier 318. The amplified downlink signal may subsequently be passed on to duplexer/filter 320 for additional filtering to separate the downlink and uplink channels, and routed to antenna 322 for downlink transmission to the MS 315.

The baseband processor 312 may further generate a control signal which can vary the gain on the uplink RF amplifier 342. As explained above, the gain on the uplink channel may be set based on the measured downlink RSSI and the power control set point of the MS. Knowing these values, the baseband processor 312 may generate the control signal based on lookup tables, logic, and/or models implemented therein. In an embodiment, the baseband processor 312 may digitally compute the RSSI from the digitized downlink signal from the BTS 305 after the leakage signal has been removed. The power control set point may be read by the baseband processor 312 from a control channel provided by the BTS 305. In other embodiments, the power control may be determined in other ways, as will be provided in more detail below in the description of FIG. 5. By adjusting the gain of the uplink RF amplifier 342, the uplink signal level transmitted back to the base station via duplexer 304 and antenna 302 may be reduced, thus reducing the repeater's 300 contribution to the noise floor (Rise over Thermal—RoT) seen at the BTS's 305 receiver. In other embodiments, the baseband processor may adjust the gain on the uplink channel in other ways. For example, the baseband processor 336 may be instructed to digitally adjust the gain in the uplink channel, or other amplifiers may be used to adjust the gain. Finally, in an embodiment, the baseband processor 312 additionally use the RF Tx reference signal to further improve the uplink transmit power. As noted above, use of the RF Tx reference signal permits better interference cancellation by accounting for more elements in the signal chain, thus various component artifacts, both linear and nonlinear, may be removed to further reduce the overall noise floor of the repeater and improve cancellation, thus permitting the repeater to transmit using more power.

Uplink signals provided by the MS 315 may be simultaneously received by antenna 322. Similar to the downlink channel described above, a leakage signal, provided over the feedback channel transmitted by antenna 302, is superimposed on the uplink channel at antenna 322. The combined uplink signal is provided to duplexer/filter 320 which filters the combined uplink signal, and routes the signal over the appropriate uplink channel in the repeater 300. The combined uplink signal may be passed to low noise amplifier 330, analog signal processing block 332, and ADC 334, which perform similar functions to the uplink signal as the counterpart blocks low noise amplifier 306, analog signal processing block 308, and ADC 310 in the downlink channel. The digitized combined uplink may then be provided to baseband processor 336, which may perform a separate feedback channel estimation and can use a separate RF Tx uplink reference signal to facilitate the channel estimation. The RF Tx uplink reference may tap off of the output of RF amplifier 342 using RF coupler 348. The analog RF signal may be provided to RF Tx Ref receiver 337 for processing and digitization. The digitized RF Tx uplink reference signal may then be provided to baseband processor 336 so that the feedback channel for the uplink channel may be estimated by the feedback channel estimation block 346. Similar in the manner described above for the downlink channel, the feedback channel estimate for the uplink channel may be used in conjunction with the channel estimate to remove the leakage signal in the baseband processor 336, using feedback cancellation block 344, from the combined uplink signal received over antenna 322. Once the leakage signal is removed, the uplink signal may be converted to an analog signal by DAC 338, further processed in analog signal processing block 340, and amplified by RF amplifier 342 prior to transmission by antenna 302.

In FIG. 3, the downlink channel and the uplink channel are shown as having separate baseband processors 312 and 336, respectively. It should be noted that these processor may be physically separate, or may be co-located within the same package. Alternatively, in some embodiments, only a single baseband processor may be used to perform the channel estimation and feedback cancellation for both the uplink and downlink channels.

It should be appreciated that various embodiments are not restricted to FDD digital baseband repeaters, and the gain control approaches described herein may be used in conjunction with other types of repeaters. Moreover, in the embodiment shown in FIG. 3, a direct conversion receiver or zero-IF receiver architecture is used to implement the receiver circuit. In other embodiments, other receiver architecture can be used. The exact implementation of the receiver architecture is not critical to the practice of the present invention.

Repeater Gain Control: Controlling Signal Levels for ADC

By leveraging the information which can be determined from the measured downlink RSSI, the power control set point of the MS, and the overall repeater gain ($G_{RPT}$), the repeater can compute the appropriately level of the signal received on the uplink at the repeater transmitted by the MS. This information may be used to set the gain on the downlink of repeater to control the level of the signal received back at the repeater on the uplink channel. Thus the repeater may "remotely" control the output of the mobile station's transmit signal level by adjusting the gain of the signal that the mobile station receives on the downlink channel. This type of adjustment can improve the signal level for quantization by the ADC in the uplink channel, which can improve performance and/or relax the dynamic range requirements of the ADC, thus allowing for a less expensive ADC to be used.

Figure 4:
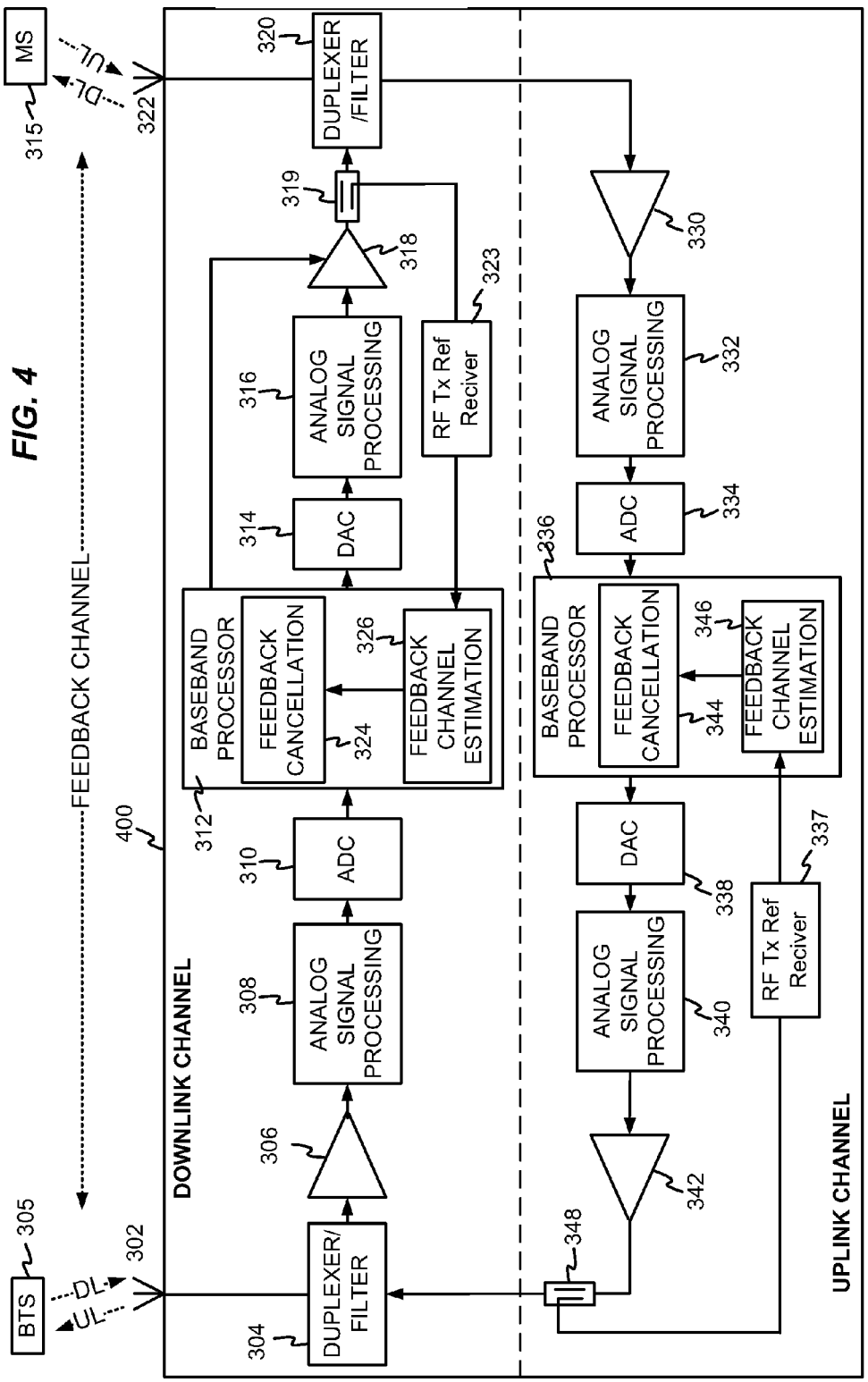
FIG. 4 is block diagram of an exemplary FDD digital baseband interference cancellation repeater which may control downlink gain based upon the measured downlink RSSI and the power control set point value to set the signal level for quantization on the uplink channel.

FIG. 4 is block diagram of an exemplary FDD digital baseband interference cancellation repeater 400 which may control downlink gain based upon measured downlink RSSI and power control rules to set the signal level for quantization on the uplink channel. The repeater 400 shown in FIG. 4 may share similar components to the repeater 300 shown in FIG. 3, which can operate in a similar manner as described above in the description of FIG. 3. Accordingly, the similar components will share the same reference numbers, and for the sake of brevity, only the differences between repeater 400 and repeater 300 are described below.

In repeater 400, the baseband processor 312 may adjust the gain of RF amplifier 318 on the downlink channel to vary the level of the signal transmitted to the MS 315 over the downlink. This gain adjustment may be determined by measuring the downlink RSSI in the baseband processor 312, and by determining the power control set point associated with the power control of the MS 315. Using these values, in conjunction with the overall gain of the repeater 400, the level of the signal at the repeater on the uplink may be determined. By determining this level, the baseband processor 312 may change the gain on the RF amplifier 318 to drive the MS 315 to change the level of its transmitted signal on the uplink. This can shift the dynamic range on the uplink channel to better scale the uplink signal for digitization by uplink ADC 334. This technique may be used to reduce the dynamic range of the uplink signal to reduce quantization and/or saturation noise. Moreover, it can permit the use of an ADC 334 having a lower dynamic range, which can reduce the cost of the ADC. Additionally, the RF Tx downlink reference may also be used in conjunction with the improved dynamic range to increase the overall uplink transmit power. The baseband processor 312 may generate the control signal used to drive RF amplifier 318 based on lookup tables, logic, and/or models implemented therein.

Combining Gain Control Techniques

In another embodiment, the uplink gain control used in repeater 300 and the downlink gain control used in repeater 400 may be combined to improve the overall performance of the repeater, thus mitigating thermal noise at the base station while improving the dynamic range and overall transmit power on the uplink of the repeater. This baseband processor 312 may utilize additional logic to best select both gains to optimize the performance of the repeater. This logic may utilize information provided by the BTS 305 to perform the optimization. For example, the BTS 305 may analyze the signal from the repeater and determine a figure of merit (e.g., signal-to-noise ratio, error vector magnitude, expected data rates, etc.), and provide instructions to the repeater over a control channel, a data channel, and/or SMS message as to how well the repeater is performing. The logic in the repeater can use this feedback information to refine the adjustments to the downlink and/or uplink gains to improve the overall operation of the repeater.

Figure 5:
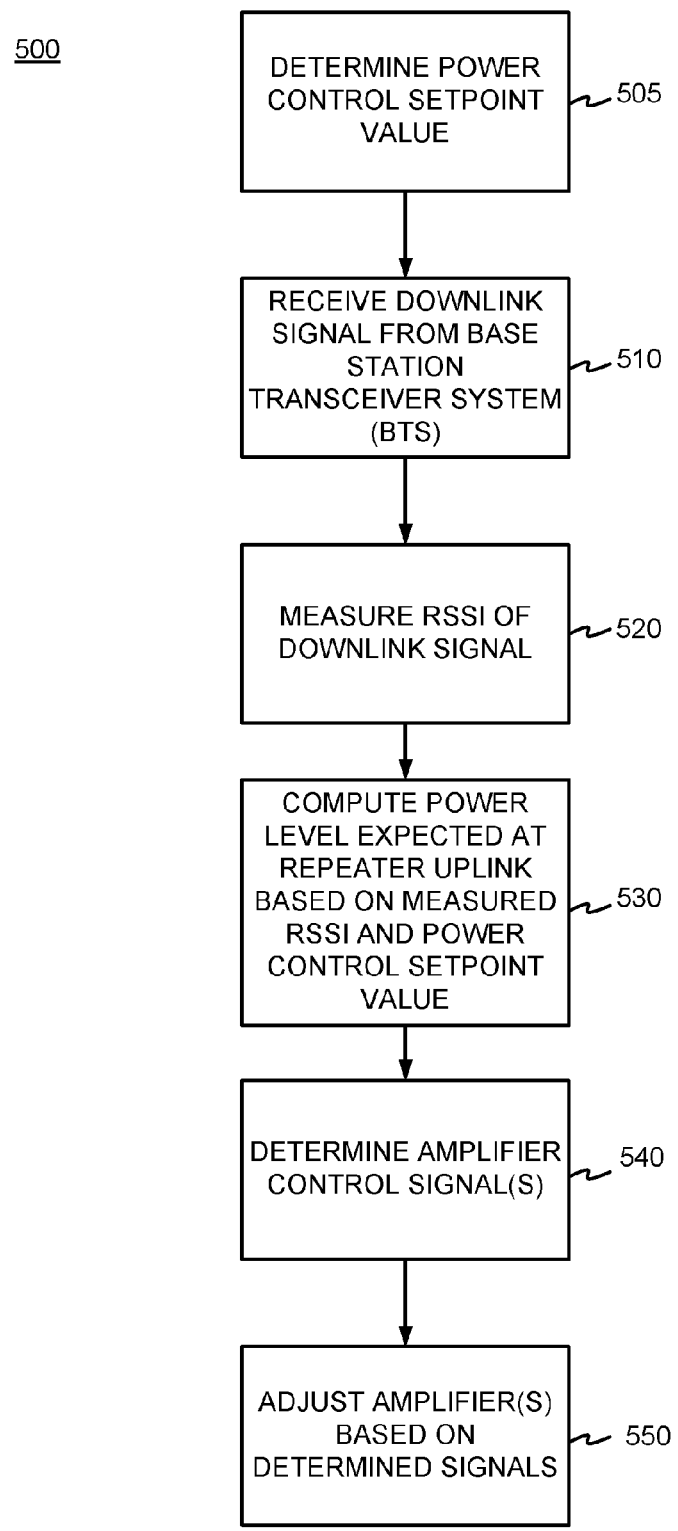
FIG. 5 is a flow chart of an exemplary process which may be associated with the repeater illustrated in FIG. 3 and/or the repeater shown in FIG. 4.

FIG. 5 is a flow chart of an exemplary process 500 which may be associated with the repeater 300 illustrated in FIG. 3 and/or repeater 400 shown in FIG. 4. The process may start by determining the power control set point value of the MS 315 (Block 505). As mentioned above, the power control set point value controls the power of the signal transmitted by the MS 315 on the uplink. The power control set point value may be, for example, read over the control channel and/or from messages in a data channel provided by the BTS 305. When multiple BTS 305 signals are received, multiple power control set point values may be associated with a particular base station and stored for later use. Alternatively, determination of the power control set point may be determined in conjunction with measuring the RSSI signal as described below. In an alternative embodiment, the power control set point value may be preprogrammed into the repeaters based upon the different network standards (e.g., IS-2000, W-CDMA, LTE, etc.). In yet another embodiment, the power control set point value may be provided by the BTS 305 over a data channel and/or using another messaging protocol, such as Simple Messaging Service (SMS). In this case, the BTS 305 may dynamically control one more repeaters to ensure, for example, that the Rise over Thermal noise is properly managed.

Next, the repeater may receive downlink signal from the BTS 305 at antenna 302 (Block 510). The RSSI of the received downlink signal may be determined by computing the magnitude of the digitized signal using the baseband processor 312, after the leakage signal is removed from the combined downlink signal (Block 520), using conventional techniques. In one embodiment, this may be performed by isolating the received signals received from one or more base stations. In a CDMA based network, this may be performed by selecting the base stations' unique PN code offsets, or identifiers in the pilot signal used to identify a base station. The magnitude of the received signal may be computed using conventional techniques, and the received signal having the largest magnitude may be selected (i.e., the selecting the "strongest" received signal). The power control set point for the BTS 305 corresponding to the largest signal may be used. As noted above, in one embodiment, this may be retrieved from memory if the set point values have already been stored (either default values or those previously read over wireless channels as mentioned in Block 505), or the power control set point may be read from a channel (data, control, SMS, etc.) corresponding to the selected BTS 305 after the strongest received signal is selected.

In an alternative embodiment, the downlink RSSI may be measured by computing the magnitude of entire signal received (i.e., prior to segregating the received signals from the different BTSs, as one base station would likely dominate the RSSI measurement). In an alternative embodiment, the power level of a downlink pilot signal may be used instead of the RSSI of the downlink signal.

Using the determined RSSI values and the power control set point value associated with the MS 315, the baseband processor 312 may compute an uplink power expected at the repeater (530). From the computed uplink power, the baseband processor 312 may determine one or more amplifier control signals (Block 540). Using the control signals, the baseband processor 312 may adjust the gain of the downlink RF amplifier 318 and/or adjust the gain of uplink RF amplifier 342 (Block 550). In alternative embodiments, the gains of other amplifiers may be adjusted and/or the baseband processor 312 may utilize a digital gain adjustment.

Figure 6:
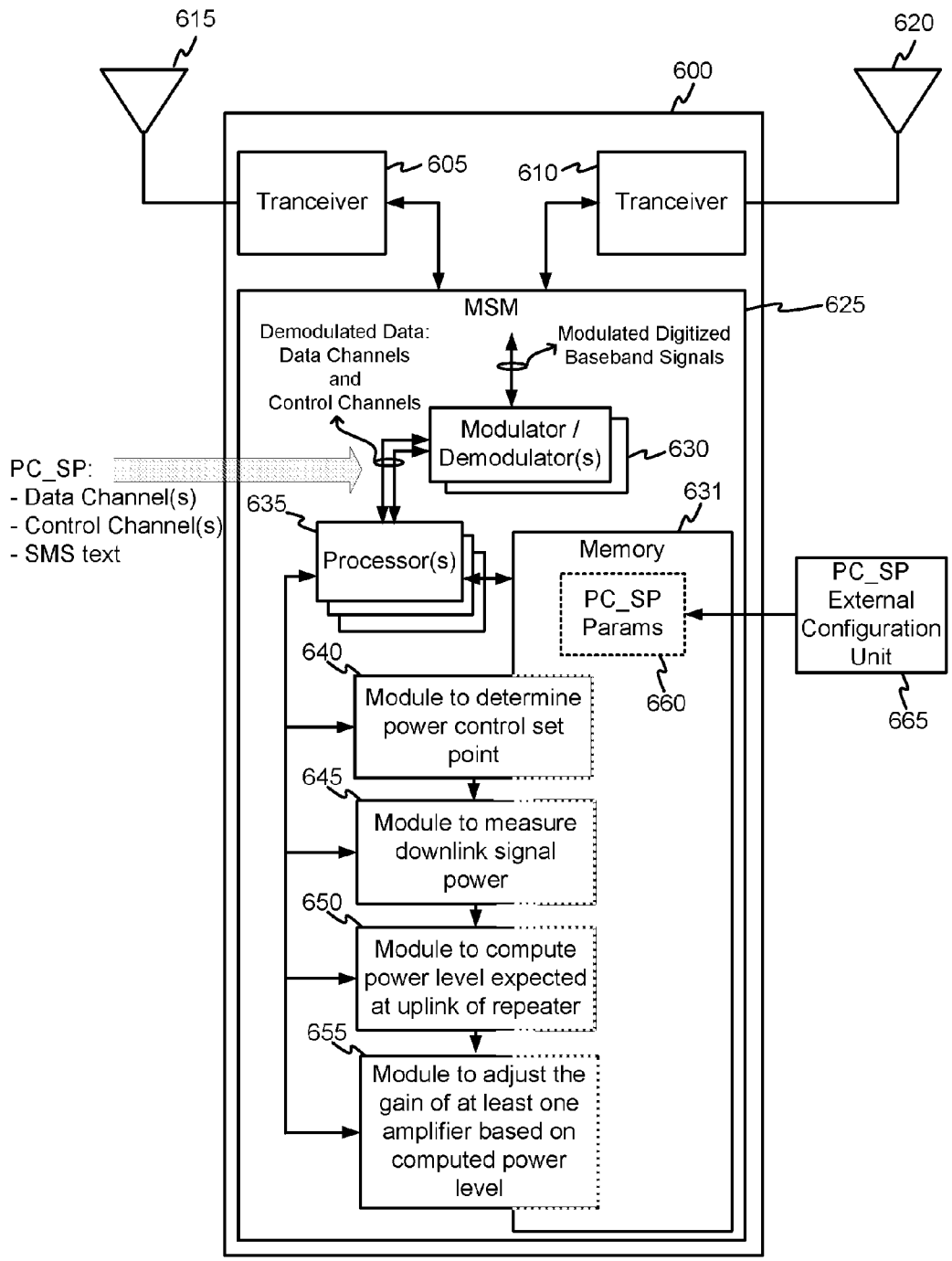
FIG. 6 is a structural block diagram of a repeater 600 which can be configured to adjust downlink and/or uplink gains in accordance with one or more embodiments of the disclosure.

FIG. 6 is a structural block diagram of an exemplary repeater 600 which can be configured to adjust downlink and/or uplink gains in accordance with one or more embodiments. Repeater 600 may include first front end block 605 and second front end block 610, a donor antenna 615, a server antenna 620, and a baseband processor realized as a Mobile Station Modem (MSM) 625. The MSM 625 may further include one or more modulator/demodulator(s) 630, one or more processor(s) 635, modules 640-655, and memory 631.

The first and second front-end blocks 605, 610 may exchange RF signals with donor antenna 615 and server antenna 620, respectively, and further exchange modulated digitized baseband signals with one or more modulator/demodulator(s) 630. The modulator/demodulator(s) 630 may include channel modulator/demodulator(s) and/or data modulator/demodulator(s). The modulator/demodulator 630 can demodulate symbols into bit streams, decode channels therefrom, and provide information from data channels and control parameters from control channels to processor(s) 635. In the other direction, processor(s) 635 may provide information from data channels and control parameters from control channels to modulator/demodulator(s) 630 to code the information into data channels and control parameters into control channels, and subsequently modulate the coded bits into symbols, thus providing modulated digitized baseband signals to first and second front end blocks 605, 610, for processing into analog RF signals suitable for transmission via donor and server antennas 615 and 620, respectively. In alternative embodiments, the processors(s) 635 may exchange bit streams with modulator/demodulator(s) 630, and the processor(s) may further perform decoding to obtain data and control channels from the bit streams, and coding to convert the data and control channels into bit streams for subsequent modulation by modulator/demodulator(s) 630 into symbols. As used above, coding and decoding may include CDMA, OFDMA, TDMA, covering/de-covering with Walsh codes, and/or any other known channelization techniques.

Once signals are received though modulator/demodulator(s) 630, the processor(s) 635 can work in conjunction with module 640 to determine the power control set point (PC_SP). In one embodiment, the PC_SP may be provided wirelessly by the BTS 305 over one or more data channels and/or one or more control channels. Alternatively, the PC_SP may be provided in an SMS message from the BTS 305. Receiving the PC_SP parameters wirelessly from the base station 305 may provide the advantage of utilizing parameters which have been updated to reflect dynamic changes in network conditions. In another embodiment, memory 631 may also have a designated memory area to store preloaded PC_SP parameters 660 corresponding to different base stations and/or networks. These values may be preprogrammed into memory, using a PC_SP external configuration unit 665, by the carrier when the repeater 600 is initialized prior to sale, and/or by the manufacturer of the repeater 600 when it is fabricated for the carriers. In some embodiments these defaults may be updated based upon the PC_SP information received wirelessly from BTS 305. The PC_SP external configuration unit 665 may be a conventional programming device using known interfaces (hardware and/or wireless) for programming, preloading and/or configuring repeaters and/or mobile devices prior to use by the end user.

The processor(s) 635 may then interact with the module 645 to measure the downlink signal power, to determine the power of the signal transmitted by the BTS 305 to the repeater 600. The power may be computed in the digital domain based on the strongest signal received by the repeater. The processor(s) 635 may then interact with the module 650 to compute power level expected at the uplink of the repeater 600. This value, as described above, may be based on the measured downlink power and the PC_SP parameter determined in modules 640 and 645, respectively. The processor(s) 635 may interact with the module 655 to adjust the gains of at least one amplifier. As described above, different amplifiers on the uplink channel and the downlink channel may be adjusted to, for example, reduce the noise at the base station 305 contributed by the repeater, and/or controlling signal levels for analog-to-digital conversion.

In the embodiment depicted in FIG. 6, the modules 640-655 may be realized as a combination of hardware modules which work in conjunction with the processors(s) 635, and software modules stored in memory 631 which may be executed by the processor(s) 635. This combination is depicted by portions of the modules 640-655 overlapping memory 631, where the overlapping portions are drawn using dotted lines. In other embodiments, modules 640-655 may be either exclusively hardware based, or exclusively processor(s) 635 based, whereby configuration of the processor(s) 635 may be performed by software based modules stored in memory 631.

The first and second front-end blocks 605, 610 each may incorporate components used in conventional wireless receivers and transmitters. Such components may include variable gain amplifiers, RF power amplifiers, low noise amplifiers, filters, mixers, drivers, modulators, de-modulators, digital-to-analog converters, analog-to-digital converters, etc. Each front end block 605, 610 may support transceiver operations using their respective antennas. For example, front end block 605 may support the transmission and reception of signals with a base station using donor antenna 615. Front end block 610 may support the transmission and reception of signals with a mobile station using server antenna 620. The front-end blocks 605, 610 may provide analog and/or digital signals which have been downconverted to baseband and provided to the MSM 625.

The baseband processor functionality described above may be performed by

MSM 625. The MSM 625 may perform a signal processing and control functions for repeater communications with the mobile device and base station, including interference cancellation and uplink and downlink gain control, as set forth in the aforementioned embodiments, include the process depicted in the flow chart shown in FIG. 5. The one or more processor(s) 635 which can be configured to perform the techniques described herein, and may include general purpose processors, digital signal processors, controllers, etc. Each of the processors may further be functionally coupled to memory 631, which may contain modules having instructions and/or data for utilization by one or more processor(s) 635 to execute processes described herein. Memory 631 may contained within the MSM 625 as shown, reside external to the MSM 625, or both. Additionally, the repeater 600 may further utilize one or more processors (not shown) in addition to those contained in the MSM 625.

Accordingly, in one embodiment, an interference cancellation repeater which controls gains based on measuring the downlink power received from a base station is provided. The interference cancellation repeater may include a means 640 for determining a power control set point value associated with a mobile station 315. The interference cancellation repeater may further include a means 630 for receiving a downlink signal from a BTS 305, and a means 645 for measuring a power of the received downlink signal. The interference cancellation repeater may further include a means 650 for computing a power level of a signal expected at the uplink of the repeater, wherein the computing is based on the measured downlink power and the power control set point value, and a means 655 for adjusting a gain of at least one amplifier based on the computed power level.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

It should be understood that any embodiments disclosed herein as being "non-transitory" do not exclude any physical storage medium, but rather exclude only the interpretation that the medium can be construed as a transitory propagating signal.

Accordingly, an embodiment of the invention can include a computer readable media embodying a method controlling gains within a repeater. The method includes determining the power control set point value which controls the power of a signal transmitted by the mobile station (MS); receiving a downlink signal from a base station transceiver system (BTS); measuring a power of the received downlink signal; computing a power level of a signal expected at the uplink of the repeater, wherein the computing is based on the measured downlink power and the power control set point value; and adjusting a gain of at least one amplifier based on the computed power level. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of controlling gains within a repeater, comprising:
    determining a power control set point value which controls a transmit power of a mobile station (MS);
    receiving a downlink signal from a base station transceiver system (BTS);
    measuring a power of the received downlink signal;
    computing a power level of a signal expected at an uplink of the repeater, wherein the computing is based on the measured downlink power and the power control set point value; and
    adjusting a gain of at least one amplifier based on the computed power level.

2. The method of claim 1, wherein determining the power control set point value further comprises at least one of reading a value provided in a control channel, retrieving a value stored in memory, reading a message provided in a data channel, mid or receiving a value from a simple message service (SMS) message.

3. The method of claim 2, wherein retrieving the value stored in memory further comprises:
    receiving the power control set point value from an external configuration unit.

4. The method of claim 1, wherein the adjusting further comprises changing a gain of an amplifier in an uplink channel of the repeater.

5. The method of claim 4, wherein the gain of the amplifier in the uplink channel is set to reduce uplink noise at the BTS which is contributed by the repeater.

6. The method of claim 1, wherein the adjusting further comprises changing a gain of an amplifier in a downlink channel of the repeater.

7. The method of claim 6, wherein the gain of the amplifier in the downlink channel is set to reduce a dynamic range of a received signal which is provided to an analog-to-digital converter.

8. The method of claim 1, wherein computing the power level is based upon at least one power control set point value used by the MS which is associated with a wireless standard.

9. The method of claim 8, wherein the wireless standard includes IS-2000, UMTS, CDMA2000, and/or LTE.

10. The method of claim 1, wherein the repeater is a frequency division duplex (FDD) digital baseband interference cancellation repeater.

11. The method of claim 1, wherein measuring the downlink power further comprises measuring a Received Signal Strength Indicator (RSSI).

12. The method of claim 1, wherein measuring the power of the received downlink signal further comprises:
    performing interference cancellation on a combined signal to remove a leakage signal; and
    computing the power level of the received downlink signal after interference cancellation.

13. An interference cancellation repeater which controls gains based on measuring downlink power received from a base station, comprising:
    a first transceiver coupled to a donor antenna;
    a second transceiver coupled to a serving antenna; and
    a baseband processor coupled to the first transceiver and the second transceiver, the baseband processor being configured to:
        determine a power control set point value which controls a transmit power of a mobile station (MS),
        receive a downlink signal from a base station transceiver system (BTS),
        measure a power of the received downlink signal,
        compute a power level of a signal expected at an uplink of the interference cancellation repeater, wherein the computing is based on the measured downlink power and the power control set point value, and
        adjust a gain of at least one amplifier based on the computed power level.

14. The interference cancellation repeater of claim 13, wherein the baseband processor is further configured to read a value provided in a control channel, retrieve a value stored in memory, read a message provided in a data channel, and/or receive the value from a simple message service (SMS) message.

15. The interference cancellation repeater of claim 14, wherein the baseband processor is further configured to receive the power control set point value from an external configuration unit.

16. The interference cancellation repeater of claim 13, wherein the baseband processor is further configured to adjust the gain by changing a gain of an amplifier in an uplink channel of the interference cancellation repeater.

17. The interference cancellation repeater of claim 16, wherein the gain of the amplifier in the uplink channel is set to reduce uplink noise at the BTS which is contributed by the interference cancellation repeater.

18. The interference cancellation repeater of claim 13, wherein the baseband processor is further configured to adjust the gain by changing a gain of an amplifier in a downlink channel of the interference cancellation repeater.

19. The interference cancellation repeater of claim 18, wherein the gain of the amplifier in the downlink channel is set to reduce a dynamic range of a received signal which is provided to an analog-to-digital converter.

20. The interference cancellation repeater of claim 13, wherein the baseband processor is further configured to compute the power level based upon at least one power control set point value used by the MS which is associated with a wireless standard.

21. The interference cancellation repeater of claim 20, wherein the wireless standard includes IS-2000, UMTS, CDMA2000, and/or LTE.

22. The interference cancellation repeater of claim 13, wherein the interference cancellation repeater is a frequency division duplex (FDD) digital baseband interference cancellation repeater.

23. The interference cancellation repeater of claim 13, wherein the baseband processor is configured to measure the downlink power by computing a Received Signal Strength Indicator (RSSI).

24. The interference cancellation repeater of claim 13, wherein the baseband processor is further configured to:
  perform interference cancellation on a combined signal to remove a leakage signal; and
  compute the power level of the received downlink signal after interference cancellation.

25. An interference cancellation repeater which controls gains based on measuring a downlink power received from a base station, comprising:
  means for determining a power control set point value which controls a transmit power of a mobile station (MS);
  means for receiving a downlink signal from a base station transceiver system (BTS);
  means for measuring a power of the received downlink signal;
  means for computing a power level of a signal expected at an uplink of the interference cancellation repeater, wherein the computing is based on the measured downlink power and the power control set point value; and
  means for adjusting a gain of at least one amplifier based on the computed power level.

26. The interference cancellation repeater of claim 25, wherein determining the power control set point value further comprises means for at least one of reading a value provided in a control channel, reading a preprogramed value, or receiving a value from a simple message service (SMS) message from the BTS.

27. The interference cancellation repeater of claim 25, wherein the adjusting further comprises means for changing the gain of an amplifier in an uplink channel of the interference cancellation repeater.

28. The interference cancellation repeater of claim 27, wherein the gain of the amplifier in the uplink channel is set to reduce uplink noise at the BTS which is contributed by the interference cancellation repeater.

29. The interference cancellation repeater of claim 25, wherein the adjusting further comprises means for changing the gain of an amplifier in a downlink channel of the interference cancellation repeater.

30. The interference cancellation repeater of claim 29, wherein the gain of the amplifier in the downlink channel is set to reduce a dynamic range of a received signal which is provided to an analog-to-digital converter.

31. The interference cancellation repeater of claim 25, wherein computing the power level is based upon at least one power control set point value used by the MS which is associated with a wireless standard.

32. The interference cancellation repeater of claim 25, wherein the power control set point value may be provided by an external configuration unit.

33. A non-transitory machine-readable medium comprising instructions, which, when executed by a machine, cause the machine to perform operations, the instructions comprising:
  instructions to determine a power control set point value which controls a transmit power of a mobile station (MS);
  instructions to receive a downlink signal from a base station transceiver system (BTS);
  instructions to measure a power of the received downlink signal;
  instructions to compute a power level of a signal expected at an uplink of a repeater, wherein the computing is based on the measured downlink power and the power control set point value; and
  instructions to adjust a gain of at least one amplifier based on the computed power level.

34. The non-transitory machine-readable medium of claim 33, further comprising instructions to determine the power control set point value by at least one of reading a value provided in a control channel, reading a preprogramed value, armor receiving a value from a simple message service (SMS) message from the BTS.

35. The non-transitory machine-readable medium of claim 33, further comprising instructions to adjust the gain by changing a gain of an amplifier in an uplink channel of an interference cancellation repeater.

36. The non-transitory machine-readable medium of claim 35, wherein the gain of the amplifier in the uplink channel is set to reduce uplink noise at the BTS which is contributed by the interference cancellation repeater.

37. The non-transitory machine-readable medium of claim 33, further comprising instructions to adjust the gain by changing a gain of an amplifier in a downlink channel of an interference cancellation repeater.

38. The non-transitory machine-readable medium of claim 37, wherein the gain of the amplifier in the downlink channel is set to reduce a dynamic range of a received signal which is provided to an analog-to-digital converter.

39. The non-transitory machine-readable medium of claim 33, further comprising instructions to compute the power level based upon at least one power control set point value used by the MS which is associated with a wireless standard.

* * * * *